US008634292B2

(12) United States Patent
Vasseur et al.

(10) Patent No.: US 8,634,292 B2
(45) Date of Patent: Jan. 21, 2014

(54) SLICED TUNNELS IN A COMPUTER NETWORK

(75) Inventors: Jean-Philippe Vasseur, Saint Martin d'Uriage (FR); Jeff Apcar, Willoughby (AU)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 13/247,548

(22) Filed: Sep. 28, 2011

(65) Prior Publication Data

US 2012/0020224 A1 Jan. 26, 2012

Related U.S. Application Data

(63) Continuation of application No. 11/680,286, filed on Feb. 28, 2007, now Pat. No. 8,040,797.

(51) Int. Cl.
*H04J 1/16* (2006.01)

(52) U.S. Cl.
USPC ............ 370/227; 370/217; 370/228; 370/229

(58) Field of Classification Search
USPC .......... 370/468, 235, 230, 227, 228, 229, 217
See application file for complete search history.

(56) References Cited

U.S. PATENT DOCUMENTS

| | | | |
|---|---|---|---|
| 6,665,273 B1 * | 12/2003 | Goguen et al. ................. | 370/252 |
| 6,765,921 B1 * | 7/2004 | Stacey et al. .................. | 370/401 |
| 6,778,492 B2 | 8/2004 | Charny et al. | |
| 6,978,394 B1 | 12/2005 | Charny et al. | |
| 7,002,927 B2 | 2/2006 | Guruprasad | |
| 7,031,262 B2 | 4/2006 | Vasseur et al. | |
| 7,136,354 B2 | 11/2006 | Fujita | |
| 7,197,008 B1 | 3/2007 | Shabtay et al. | |
| 7,319,700 B1 * | 1/2008 | Kompella ..................... | 370/400 |
| 7,340,169 B2 * | 3/2008 | Ovadia et al. ................. | 398/57 |
| 7,512,063 B2 | 3/2009 | Vasseur et al. | |
| 7,564,871 B2 * | 7/2009 | Liu ............................... | 370/468 |
| 7,570,649 B2 * | 8/2009 | Qian et al. .................... | 370/400 |

(Continued)

OTHER PUBLICATIONS

Awduche, D., Network Working Group Request for Comments 3209, entitled "RSVP-TE: Extensions to RSVP for LSP Tunnels," IETF, Dec. 2001, pp. 1-57.

(Continued)

*Primary Examiner* — Ricky Ngo
*Assistant Examiner* — Dewanda Samuel
(74) *Attorney, Agent, or Firm* — Novak Druce Connolly Bove + Quigg LLP

(57) ABSTRACT

In one embodiment, a path for a sliced tunnel that extends from a head-end node to a tail-end node is computed. The sliced tunnel is furcated into a plurality of child tunnels at one or more fork nodes located downstream from the head-end node. Each child tunnel carries a portion of traffic for the sliced tunnel. The sliced tunnel is merged at one or more merge nodes located downstream from respective ones of the fork nodes. The portions of traffic on the child tunnels are aggregated at the merge nodes. The head-end node sends a signaling message to establish the sliced tunnel along the computed path. The signaling message includes an indication of the one or more fork nodes where the sliced tunnel is furcated into child tunnels and the one or more merge nodes where child tunnels are merged. The head-end node then forwards traffic onto the sliced tunnel.

20 Claims, 7 Drawing Sheets

(56) References Cited

U.S. PATENT DOCUMENTS

| | | | |
|---|---|---|---|
| 7,639,603 B2* | 12/2009 | Oda et al. | 370/218 |
| 7,664,877 B1* | 2/2010 | Sheth | 709/242 |
| 8,169,924 B2* | 5/2012 | Sajassi et al. | 370/249 |
| 2001/0032271 A1* | 10/2001 | Allen | 709/239 |
| 2002/0093954 A1* | 7/2002 | Weil et al. | 370/389 |
| 2003/0126287 A1 | 7/2003 | Charny et al. | |
| 2003/0189898 A1 | 10/2003 | Frick et al. | |
| 2003/0210693 A1 | 11/2003 | Grabner et al. | |
| 2003/0229807 A1 | 12/2003 | Qiao et al. | |
| 2005/0207337 A1 | 9/2005 | Oda et al. | |
| 2006/0039391 A1 | 2/2006 | Vasseur et al. | |
| 2006/0171316 A1 | 8/2006 | El-Sakkout et al. | |
| 2006/0215548 A1 | 9/2006 | Le Faucheur et al. | |
| 2007/0206494 A1* | 9/2007 | Swallow | 370/225 |

OTHER PUBLICATIONS

Smit, H., Network Working Group Request for Comments 3784, entitled "Intermediate-System-to-Intermediate-System (IS-IS) Extensions for Traffic Engineering (TE)," IETF, Jun. 2004, pp. 1-13.

Katz, D. et al, Network Working Group Request for Comments 3630, entitled "Traffic Engineering (TE) Extensions to OSPF Version 2," IETF, Sep. 2003, pp. 1-14.

Braden, R. et al., Network Working Group Request for Comments 2205, entitled "Resource ReSerVation Protocol (RSVP), Version 1 Functional Specification," IETF, Sep. 1997, pp. 1-105.

Berger, L., Network Working Group Request for Comments 3473, entitled "Generalized Multi-Protocol Label Switching (GMPLS) Signaling Resource ReserVation Protocol-Traffic Engineering (RSVP-TE) Extensions," IETF, Jan. 2003, pp. 1-40.

* cited by examiner

SLICED TUNNELS IN A COMPUTER NETWORK

RELATED APPLICATIONS

This application for United States patent is a continuation of U.S. patent application Ser. No. 11/680,286 filed on Feb. 28, 2007 by Jean-Philippe Vasseur et al., entitled "Sliced Tunnels in a Computer Network", the contents of which are incorporated by reference herein in their entirety.

TECHNICAL FIELD

The present disclosure relates generally to computer networks, and, more particularly, to tunnels within computer networks.

BACKGROUND

Path computation for tunnels of a computer network, e.g., label switched paths (LSPs), typically results in tunnels that traverse a single path, whether that path is a point-to-point (P2P) path, point-to-multipoint (P2MP) path, etc. For example, tunnels in many Multi-Protocol Label Switching (MPLS) Traffic Engineering (TE) networks (e.g., MPLS TE-LSPs) are computed using a constrained shortest path first (CSPF) algorithm. As those skilled in the art will understand, CSPF offers high flexibility and scalability, and is well-equipped to handle frequent topology changes, dynamic traffic demands, and resource availability changes. According to CSPF (for example), when a tunnel is built to satisfy a bandwidth constraint of "X", the tunnel only follows a single path between a head-end node and one or more tail-end node of tunnels (e.g., the shortest path).

In the event the bandwidth constraint X is greater than the available bandwidth of links between the head and tail-end nodes, then no single path is available for the tunnel (i.e., the bandwidth constraint cannot be satisfied). Currently, if a tunnel requires a bandwidth greater than what is available along a single path between the head and tail-end nodes, the only way to satisfy the constraint is to establish multiple tunnels between the head and tail-end nodes whose reserved bandwidths are each smaller than X and when combined total X (or greater than X). Similarly, if there are multiple parallel links/circuits available between a pair of nodes along a tunnel's path, the tunnel may only utilize one of them. In order to utilize the multiple parallel links, multiple corresponding tunnels must be created from a head-end node where each follows the same path but over a different parallel link.

In either situation above, the respective head-end node of the multiple tunnels is thus required to load balance traffic between the multiple tunnels. Also, in many instances, these multiple tunnels share various links between the head and tail-end nodes (e.g., where those shared links have available bandwidth greater than X), resulting in an increased number of tunnels on those shared links. For example, as mentioned above, if two intermediate nodes along a path have ten parallel links between them, each having one tenth of the bandwidth X, a head-end node would need to establish ten tunnels along the entire path in order to utilize those ten parallel links. As such, each other link/node along the path may be required to maintain those ten tunnels. These multiple tunnels may be a burden to the head-end node and intermediate nodes to maintain, and generally do not scale well (particularly for long paths requiring many tunnels).

Note, also, that one or more of these issues apply to backup tunnels, such as those offering bandwidth protection where it is difficult to compute a single backup tunnel that supports the entire amount of protected bandwidth. In particular, multiple backup tunnels at a point of local repair (PLR) for a protected tunnel are generally difficult to maintain, as will be understood by those skilled in the art (e.g., selection of a single backup tunnel requiring packing algorithms, etc.). Also, even if a particular path could satisfy the bandwidth constraint of a backup tunnel it may be more desirable to spread the backup load amongst several paths if possible.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a sliced tunnel is signaled between a head-end node and a tail-end node. One or more fork nodes along the sliced tunnel are configured to furcate the sliced tunnel into a plurality of child tunnels of the sliced tunnel. Also, one or more merge nodes along the sliced tunnel are configured to merge a plurality of child tunnels of the sliced tunnel that intersect at the merge node.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

Figure 1:
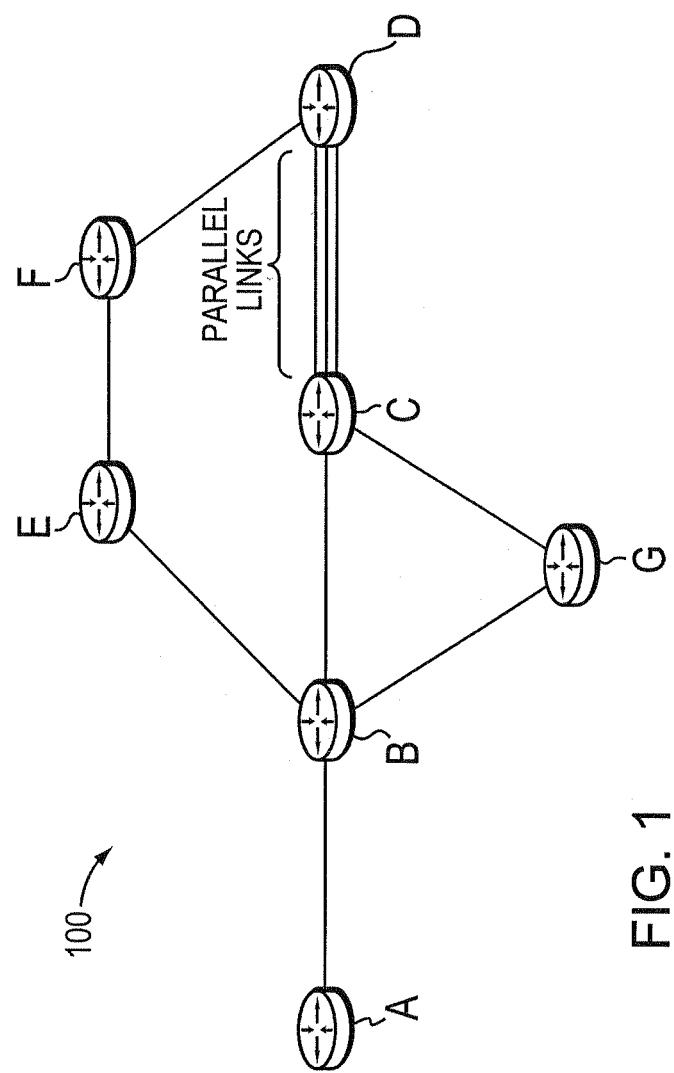
FIG. 1 illustrates an example computer network.

FIG. 1 is a schematic block diagram of an example computer network 100 illustratively comprising nodes (e.g., routers) A-G interconnected by links as shown. Illustratively, multiple (e.g., three) parallel links are shown interconnecting nodes C and D, as will be understood by those skilled in the art. Those skilled in the art will also understand that any number of nodes, routers, links, etc. may be used in the computer network, and that the view shown herein is for simplicity. Further, those skilled in the art will also understand that while the present invention is described generally, it may apply to customer networks and provider core networks with provider (P) and provider edge (PE) routers, any network configuration within an AS or area/level, or throughout multiple ASes or areas/levels ("inter-domain"), etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
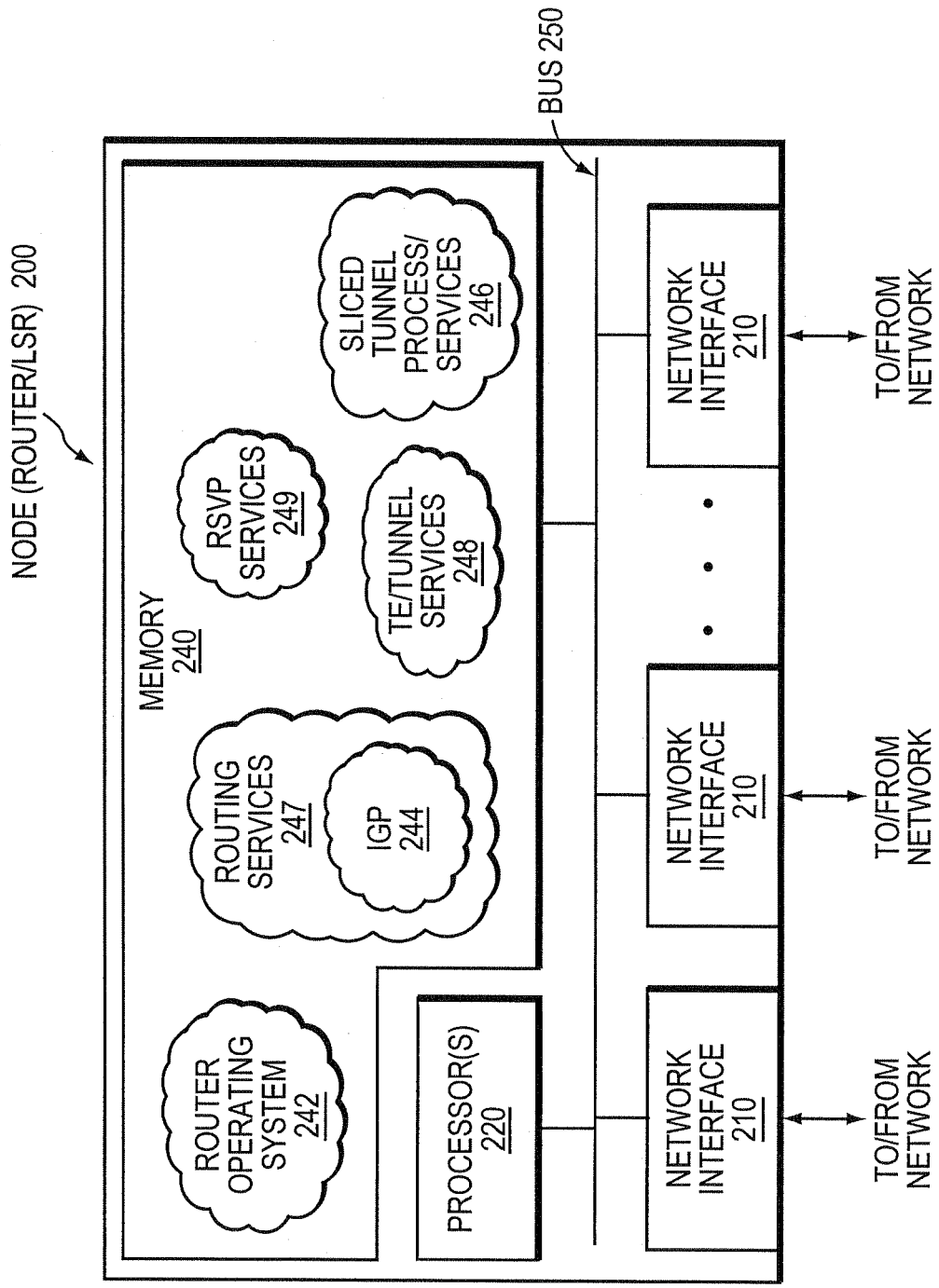
FIG. 2 illustrates an example network device/node.

FIG. 2 is a schematic block diagram of an example node/router 200 that may be advantageously used with one or more embodiments described herein, e.g., as a head-end node, intermediate node, or tail-end node (label switched routers, "LSRs"). The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing services 247, Interior Gateway Protocol (IGP) services 244, Resource ReSerVation Protocol (RSVP) services 249, Traffic Engineering (TE)/Tunnel services 248, and as described herein, an example sliced tunnel process/service 246. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., Open Shortest Path First, "OSPF," and Intermediate-System-to-Intermediate-System, "IS-IS") as IGP services 244, the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services 244, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
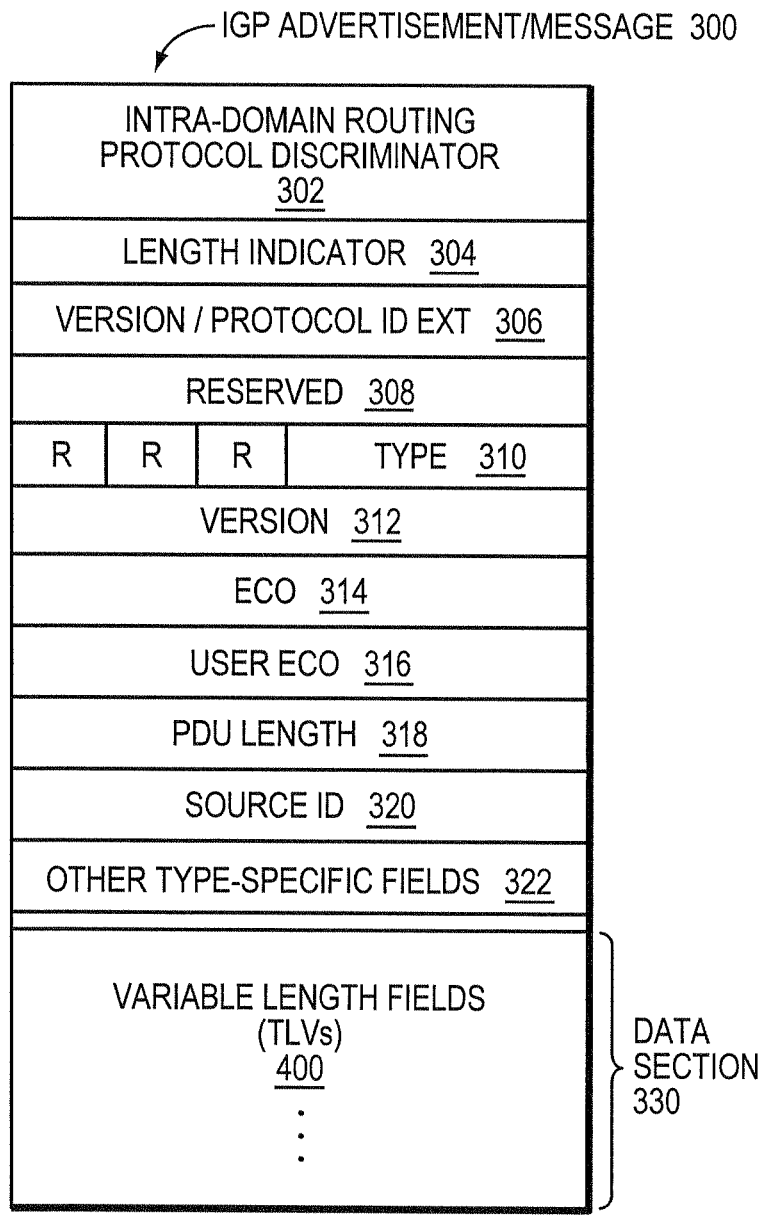
FIG. 3 illustrates an example IGP message.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the one or more embodiments described herein, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and one or more novel fields (e.g., sub-TLVs in a Router Capability TLV), described further below. Generally, the received IGP advertisements are stored in a link state database (LSDB) of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
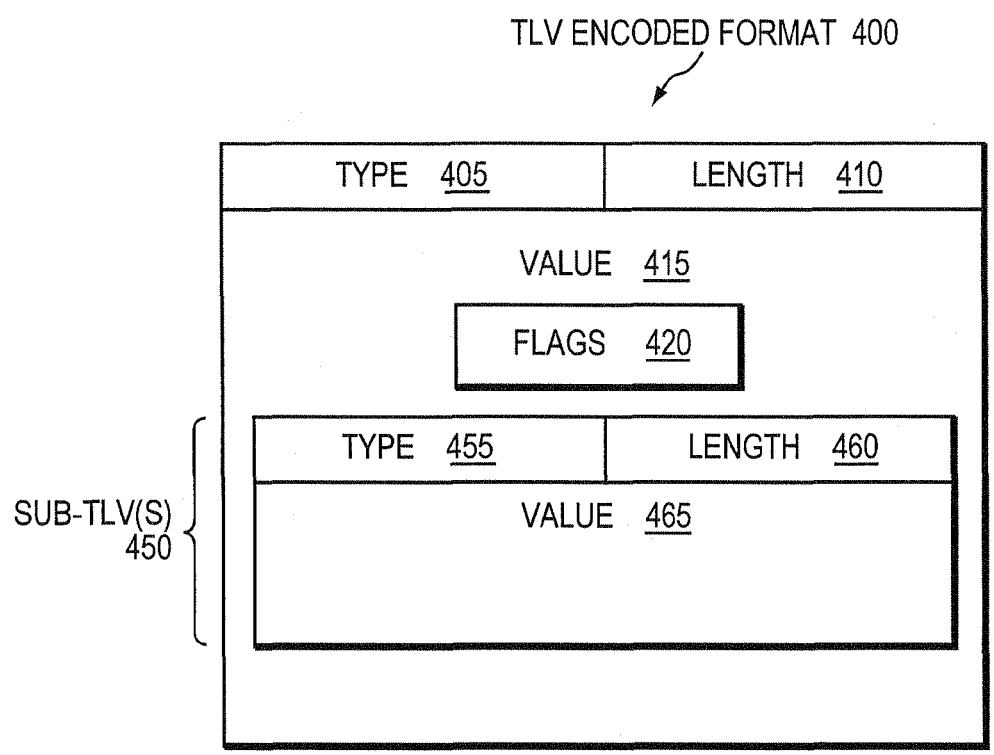
FIG. 4 illustrates an example TLV format.

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein. Notably, for use with OSPF link state advertisements as IGP advertisements 300, TLVs 400 (e.g., in accordance with the embodiments described herein) may be contained within specific types of advertisements (e.g., Router Information advertisements), or with opaque advertisements, as will be understood by those skilled in the art. The use of IS-IS link state packets, therefore, is merely a representative example.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages in accordance with the embodiments described herein. Further, TE services 248 contain computer executable instructions for implementing TE functions in accordance with the embodiments described herein.

Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE Database (TED, not shown) may be illustratively resident in memory 240 and used to store TE information provided by the routing protocols, such as IGP, BGP, and/or RSVP (e.g., with TE extensions as described herein). The TED may be illustratively maintained and managed by TE services 248.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

In particular, in accordance with RSVP, to request a data flow (tunnel) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the tunnel. The Path message may contain various information about the data flow including, e.g., traffic characteristics of the data flow. Also in accordance with the RSVP, a receiver establishes the tunnel between the sender and receiver by responding to the sender's Path message with a reservation request (Resv) message. The reservation request message travels upstream hop-by-hop along the flow from the receiver to the sender (i.e., along intermediate nodes). The reservation request message contains information that is used by intermediate nodes along the flow to reserve resources for the data flow between the sender and the receiver, to confirm the attributes of the tunnel, and provide a tunnel label. If an intermediate node in the path between the sender and receiver acquires a Path message or Resv message for a new or established reservation (tunnel) and encounters an error (e.g., insufficient resources, failed network element, etc.), the intermediate node generates and forwards a path or reservation error (PathErr or ResvErr, hereinafter Error) message to the sender or receiver, respectively.

Figure 5:
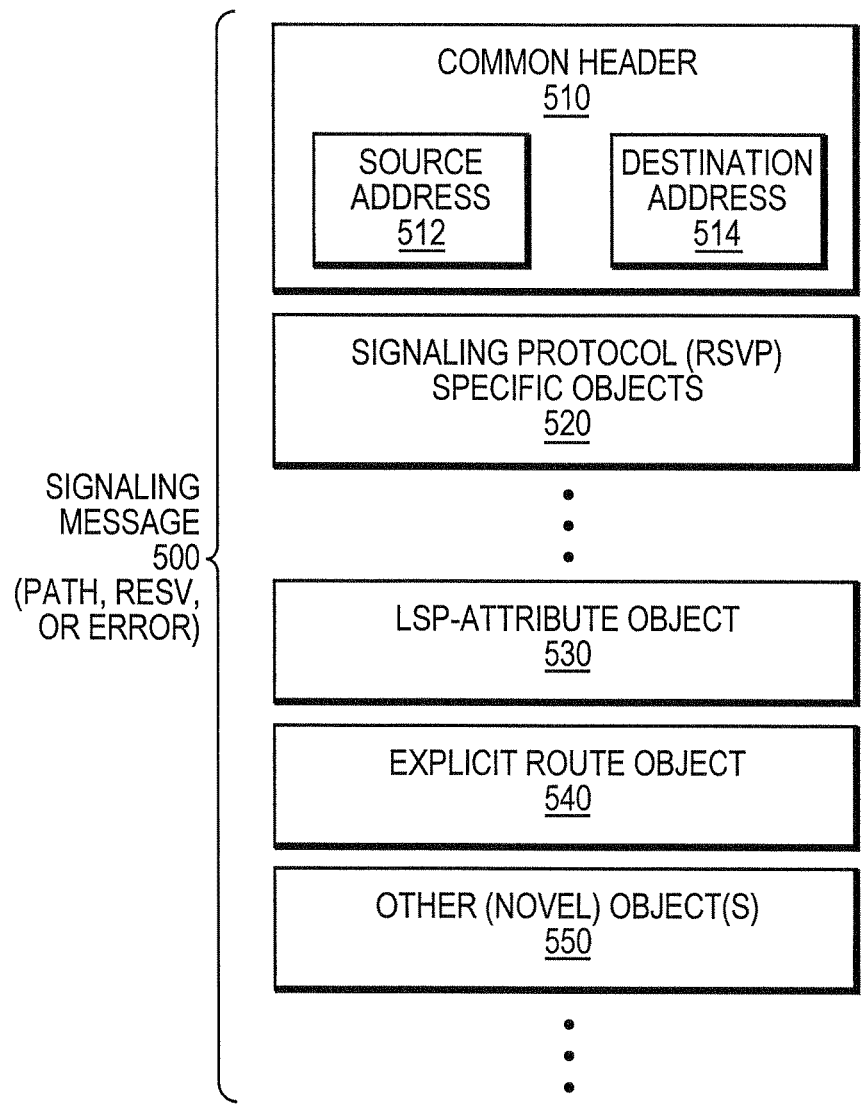
FIG. 5 illustrates an example RSVP message.

FIG. 5 is a schematic block diagram of portions of a signaling message 500 (e.g., RSVP message, such as Path, Resv or Error) that may be advantageously used with the present invention. Message 500 contains, inter alia, a common header 510, one or more signaling protocol specific objects 520, such as an LSP-Attribute object 530, an Explicit Route Object 540, as well as one or more other (e.g., novel) objects 550, described below. The common header 510 may comprise a source address 512 and destination address 514, denoting the origination and requested termination of the message 500. Protocol specific objects 520 contain objects necessary for each type of message 500 (e.g., Path, Resv, Error, etc.). For instance, a Path message may have a sender template object, Tspec object, Previous-hop object, etc. A Resv message, on the other hand, may have specific objects 520 for a label object, session object, filter spec object, etc. Also, Error messages 500 (e.g., PathErr or ResvErr), may also have specific objects 520, such as for defining the type of error, etc. Various flags and/or TLVs 400 may also be contained within the objects 520-540, as will be understood by those skilled in the art.

It should be noted that in accordance with RSVP signaling, the state of the RSVP is refreshed on a timed interval, e.g., every thirty seconds, in which RSVP Path and Resv messages are exchanged. This timed interval is configurable by a system administrator. Moreover, various methods understood by those skilled in the art may be utilized to produce route record objects (RROs) contained in signaling messages for a tunnel.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not co-located on the head-end node. Various path computation methodologies are available including CSPF (constrained shortest path first).

As noted, there are occasionally situations where a head-end node is unable to compute a path for a tunnel, e.g., where no single path is available having a required bandwidth of the tunnel. Also, where intermediate nodes along a path are interconnected by multiple parallel links, a head-end node may only make use of one of the parallel links for a single tunnel. Accordingly, head-end nodes are generally forced to establish multiple tunnels over multiple paths (e.g., to distribute the bandwidth requirement and/or to utilize the parallel links), regardless of any shared links between the head and tail-end nodes, resulting in an increased number of tunnels on those shared links. These multiple tunnels may be a burden to the head-end node and intermediate nodes (for shared links) to maintain, and generally do not scale well (particularly for long paths requiring many tunnels). Also as noted, the same issues may apply to backup tunnels.

For example, with reference again to FIG. 1, head-end node A may desire to establish a tunnel to tail-end node D. Assume that the link between nodes B and E ("link B-E"), link B-C, link B-G, as well as the three links between nodes C and D ("link C-D.1", "link C-D.2", and "link C-D.3") each may only support approximately one third of a required bandwidth for the desired tunnel. As such, head-end node A may not be able to compute a single path to reach the tail-end node D. As mentioned above, a current solution may result in several tunnels of a lower bandwidth constraint being provisioned, for example, a first tunnel traversing a path A-B-E-F-D, a second tunnel traversing a path A-B-C-D.1, and a third tunnel traversing a path A-B-G-C-D.2 (none shown). Note that to utilize link C-D.3 (e.g., to take advantage of the third parallel link), a fourth tunnel would need to be established between the head and tail-end nodes, e.g., A-B-C-D.3 (also not shown). These multiple tunnels may be burdensome to the head-end node or any intermediate node along the paths maintaining the multiple tunnels, particularly with large-scale use of tunnels in the network 100, where many desired tunnels result in multiple tunnels across the network.

Sliced Tunnels

According to embodiments of the disclosure, a sliced tunnel is signaled between a head-end node and a tail-end node. One or more fork nodes along the sliced tunnel are configured to furcate the sliced tunnel into a plurality of child tunnels of the sliced tunnel. Also, one or more merge nodes along the sliced tunnel are configured to merge a plurality of child tunnels of the sliced tunnel that intersect at the merge node.

In an illustrative embodiment, sliced tunnel process/services 246 contain computer executable instructions executed by each processor 220 to perform functions relating to the novel techniques described herein to establish and maintain sliced tunnels in a computer network. For example, a head-end node may utilize its sliced tunnel process to perform head-end node sliced tunnel functions, a fork node may utilize its sliced tunnel process to perform fork node sliced tunnel functions, and a merge node may utilize its sliced tunnel process to perform merge node sliced tunnel functions, etc.

Figure 6:
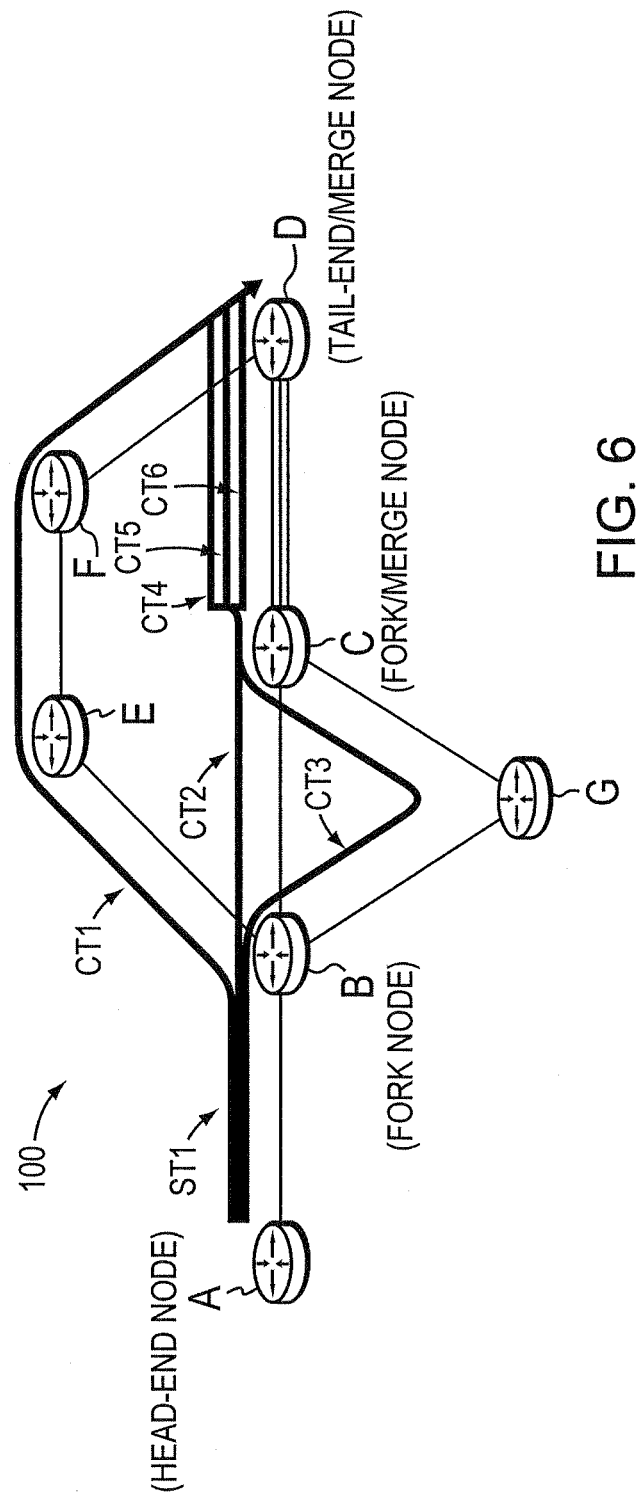
FIG. 6 illustrates the computer network of FIG. 1 with an example sliced tunnel in accordance with one or more embodiments described herein.

Operationally, a head-end node (e.g., node A) that wishes to establish a tunnel to a tail-end node (e.g., node D) having a desired bandwidth may be configured to allow sliced tunnels (e.g., manually and/or dynamically). A sliced tunnel, as used herein, is a tunnel that has been enabled for slicing along the path to satisfy bandwidth constraints or utilize multiple links between adjacent nodes. FIG. 6 illustrates the computer network 100 of FIG. 1 with an example sliced tunnel (shown as the thick lines and arrows) in accordance with one or more embodiments described herein. As can be seen, for example, rather than provisioning a set of primary tunnels between a source (head-end node) and destination (tail-end node), a sliced tunnel path generally includes one or more segments having the entire tunnel (e.g., a single tunnel reserving all of the desired bandwidth, or a "main trunk", "ST1") and one or more segments that are furcated (sliced, split, divided, etc., into "child tunnels", such as "CT1"-"CT6") at different nodes ("fork nodes") along the path and merged at other nodes ("merge nodes").

In particular, child tunnels begin at a fork node and end at a merge node. Fork nodes, for example, may be any intermediate node or the head-end node that is configured to furcate a sliced tunnel into a plurality of child tunnels of the sliced tunnel (e.g., with sliced tunnel process 246). Notably, child tunnels may be furcated from the sliced tunnel's main trunk, or may be further sliced from other child tunnels. Merge nodes, on the other hand, may be any intermediate node or the tail-end node that is configured to merge two or more child tunnels of a same sliced tunnel that intersect at the merge node (e.g., with sliced tunnel process 246), such as into a main trunk of the sliced tunnel or into one or more other child tunnels, as described herein. Fork nodes and merge nodes are not mutually exclusive, and a single node may be both a fork node and a merge node, also as described herein.

Illustratively, the fork nodes and/or merge nodes may be configured to advertise their abilities as fork nodes and/or merge nodes to path computation devices (e.g., head-end nodes, other fork nodes, path computation elements or "PCEs", etc.). For example, a new TLV 400 within an IGP message 300 (e.g., a Router Capability TLV for IS-IS or a Router Information advertisement for OSPF, etc.) may specify the corresponding abilities to other nodes within the network 100 for appropriate computation of paths. In this manner, the path computation device may learn of the abilities prior to computing the path (e.g., where the sliced tunnel may be sliced/furcated and/or merged).

According to one or more embodiments described herein, the sliced tunnel process 246 of the head-end node (e.g., node A) may be configured to compute a path for the sliced tunnel and any corresponding child tunnels to a tail-end node (e.g., node D). For instance, assume, as mentioned above, that link B-E, link B-C, link B-G, and each of the three links C-D.1, C-D.2, and C-D.3 each may only support approximately one third of a required bandwidth for the desired tunnel, e.g., "⅓X" (where "X" represents the desired bandwidth). Further assume that each other link may support a bandwidth of X. Since no single path exists for the tunnel in network 100 between the head-end node and the tail-end node, the head-end node may determine that a sliced tunnel may be used accordingly. For example, the head-end node may be configured to dynamically determine that no single path exists prior to computing a sliced tunnel, or may be configured to compute a sliced tunnel regardless, where if a single path exists, the "sliced tunnel" is embodied as a single conventional tunnel (i.e., no child tunnels). Computation of a sliced tunnel, for instance, may utilize a modified CSPF that is adapted to compute a shortest path between the head-end node and tail-end node that may include one or more child tunnels accordingly.

Illustratively, the sliced tunnel (ST1) as computed may comprise a first portion along link A-B to a first fork node B that furcates the sliced tunnel into child tunnels CT1 to node E, CT2 to node C, and CT3 to node G. CT1 may traverse intermediate node F toward the tail-end node D, while child tunnels CT2 and CT3 (through intermediate node G) merge at merge node C. In certain network configurations, for example, adjacent nodes may be interconnected by a plurality of parallel links (such as a link bundle), e.g., links C-D.1, C-D.2, and C-D.3, as mentioned above. Accordingly, node C (also a fork node) may furcate child tunnels (CT4, CT5, and CT6) that are merged at the adjacent merge node (node D). The tail-end node D may thus be configured as a merge node to merge child tunnels of the sliced tunnel (CT1, CT4, CT5, and CT6). In this manner, the sliced tunnel may acquire its desired bandwidth ("X") by dividing the requirement among a plurality of child tunnels that totals the desired bandwidth along the sliced tunnel path between the head-end node and the tail-end node.

To establish the sliced tunnel, a sliced tunnel process 246 of the head-end node (e.g., in conjunction with RSVP process 249 and/or Tunnel/TE process 248) may signal the sliced tunnel along the computed path. Illustratively, RSVP signaling messages 500 with TE extensions may be used to signal the sliced tunnel, accordingly (e.g., Path and Resv messages). In particular, one or more objects of the signaling messages may be used to encode the paths followed by the sliced tunnel, e.g., including an indication of the computed child tunnels. For example, within the ERO 540, one or more sub-EROs may be ordered in the form of a heap to encode child tunnels. Alternatively, the ERO 540 may be encoded with all relevant route information of the sliced tunnel, without sub-EROs. For instance, an example ERO encoding in the illustrative example may comprise (in a "node-to-node" or "N-N" format): [A-B, B-E, B-C, B-G, C-D.1, C-D.2, C-D.3, E-F, F-D, G-C], where furcated child tunnels are represented by multiple entries of a fork node (e.g., node B), and merge nodes are represented by multiple entries of a receiving node (e.g., node D), etc. Note that the signaling message 500 may further be configured to include a listing of fork and/or merge nodes to explicitly inform those nodes of their chosen tasks (e.g., in novel object 550), or the fork/merge node may dynamically (implicitly) determine its task based on the occurrences of the node within the ERO 540, or based on receiving multiple Path messages 500 for the sliced tunnel (e.g., a merge node receiving Path messages from a plurality of child tunnels).

In addition to conventional tunnel characteristics of the sliced tunnel that may be signaled within the LSP-Attribute field 530, one or more novel sliced tunnel characteristics may also be signaled within field 530 or within novel field(s) 550. For example, tunnel characteristics of each child tunnel, rules to use when merging child tunnels, furcation/load-balancing techniques to utilize when forwarding traffic, etc., may also be indicated by the signaling of the sliced tunnel. Illustratively, transmission of signaling messages 500 for the sliced tunnel may comprise a Path message for the sliced tunnel, and for signaling along each child tunnel, a child-tunnel-specific "sub-Path" message may be appended to the Path message of the sliced tunnel. For instance, the Path message may indicate a sliced tunnel identification (ID), attributes of the sliced tunnel, head and tail-end nodes (e.g., node A and D, respectively), etc. Upon receiving the path message, the fork node may append a child tunnel sub-Path message, which may include the child tunnel ID, sub-EROs, head and tail-end nodes of the child tunnel (i.e., fork and merge nodes), etc. (Note that for a returned Resv message, a merge node as defined herein acts as a fork node in reverse, and may append sub-Resv messages in a similar manner for child tunnels.) Those skilled in the art will appreciate that other signaling formats/embodiments may be used to signal a sliced tunnel, and that those described herein are merely examples.

Notably, in accordance with one or more embodiments described herein, the fork nodes (e.g., sliced tunnel process 246 of the fork nodes) may be configured to compute the child tunnels (e.g., alternatively or in addition to the head-end node computing the child tunnels). In particular, the head-end node may signal the sliced tunnel as a sliceable tunnel (e.g., as a tunnel attribute, such as in LSP-Attribute object 530 of an RSVP Path message 500), and in response, fork nodes along the path may decide to furcate/slice the tunnel as necessary (or beneficially). For example, for loose hop routing (e.g., where the head-end node is unaware of various segments of the path, such as for inter-domain path computation), fork nodes along the "unknown" sections of the sliced tunnel (hidden by loose hops) may decide to create child tunnels accordingly. In other words, the head-end node may compute all of the child tunnels, some of the child tunnels, or none of the child tunnels of the sliced tunnel, depending upon various configurations described herein.

Once the sliced tunnel (e.g., ST1) is established, that is, once the sliced tunnel and any associated child tunnels (e.g., CT1-CT6) are established, the head-end node (e.g., node A) may begin to forward traffic onto the sliced tunnel. Note that where the head-end node is not a fork node (e.g., as shown), the head-end node need not change its forwarding algorithm, but simply forwards corresponding traffic onto the sliced tunnel as it would any other tunnel. In fact, the head-end node need not be aware of the child tunnels if not computed by the head-end node, as described above.

A downstream intermediate node (e.g., node B) receives the traffic on the sliced tunnel, and if the node is a fork node, may "slice" (e.g., load balance) the incoming traffic onto a set of child tunnels (e.g., child tunnels CT1, CT2, and CT3). For example, traffic split/sliced at a fork node may be performed (e.g., by sliced tunnel process 246 of the fork node) using token buckets sized according to the bandwidth of each child tunnel (e.g., using a hashing function, on a per packet basis), or other known techniques to divide traffic among a plurality of tunnels as understood by those skilled in the art. Traffic along the sliced tunnel or child tunnels continues along its corresponding tunnel path, potentially being further sliced by other fork nodes (e.g., node C) on the way to the tail-end node (e.g., node D).

When traffic from multiple child tunnels is received at a merge node (e.g., node C), the sliced tunnel process 246 of the merge node merges (combines) the traffic, and forwards the traffic onto the sliced tunnel accordingly. For example, instead of a conventional one-to-one mapping of incoming tunnel label to outgoing tunnel label, embodiments described herein effectively create a plurality-to-one mapping at a merge node. Assuming the parallel links C-D are a single link, the merge node C merges traffic from CT2 and CT3 onto the sliced tunnel, e.g., a child tunnel over the single link between nodes C and D. Illustratively, however, node C as shown is a merge node as well as a fork node (for the parallel links), and as such may merge the traffic from CT2 and CT3, and may fork the merged traffic onto a plurality of child tunnels, e.g., CT4, CT5, and CT6, in accordance with a plurality-to-plurality (e.g., 2-to-3) mapping. Node D, on the other hand, is a merge node as well as a tail-end node, and thus may merge the traffic and forward according to a technique with which the tail-end node is so configured, e.g., conventional IP routing, additional tunnel forwarding/switching, etc.

Note that "penultimate hop popping" (PHP), as will be understood by those skilled in the art, should only occur for the tail-end node of the sliced tunnel (e.g., node D), and not for "tail-end nodes" (merge points) of child tunnels (that is, that are not the tail-end node for the sliced tunnel, as is node D). In particular, the child tunnel merge points are technically intermediate nodes along the sliced tunnel, i.e., child tunnels are particular portions of the sliced tunnel, and thus no PHP should be performed.

In the event of a failure of a child tunnel (e.g., failure of a link or node along the child tunnel), the head-end node may be configured to determine failure of the sliced tunnel or simply a failure of that particular tunnel slice (e.g., and a loss of a corresponding amount of bandwidth, for instance, in the example, ⅓ X), i.e., such that in the latter case, failure of the child tunnel does not result in failure of the sliced tunnel. If the head-end node is aware of the child tunnels, an Error message 500 may be sent to the head-end node indicating the failure, and the head-end node may decide what action to take (if any), accordingly. Alternatively, e.g., where the head-end node is unaware of the child tunnels (that is, where the fork nodes compute the child tunnels and do not inform the head-end node of those computed tunnels), the Error message 500 may indicate a reduced bandwidth of the sliced tunnel (corresponding to the bandwidth carried by the failed child tunnel), or may indicate a total sliced tunnel failure. Illustratively, rules defining the actions to be taken in response to a failure of a child tunnel may be carried with signaling messages 500 of the sliced tunnel (e.g., within objects 530, 550, etc.), accordingly.

In accordance with failure protection of the sliced tunnel (e.g., Fast Reroute, or "FRR", as will be understood by those skilled in the art), it may be necessary to accommodate careful considerations when establishing backup tunnels for sliced tunnels. For instance, it may be desired to locate and establish a backup tunnel that protects (i.e., by-passes) a fork node prior to merging with the sliced tunnel downstream from the merge node that merges any child tunnels of the protected fork node. Also, a fork node may protect each of its child tunnels separately, or may have a single backup tunnel to protect all of the child tunnels, etc. For instance, a backup child tunnel may be used to protect a primary child tunnel, such that upon failure of the primary child tunnel, the fork node simply forwards traffic onto the backup child tunnel as it would any other child tunnel. Other considerations of failure protection not specifically described herein may be considered by backup path computations, such as how to protect a child tunnel with a backup tunnel that merges onto the sliced tunnel downstream rather than at the protected child tunnel, etc.

Notably, the sliced tunnel (ST1) may be a backup tunnel for a particular tunnel, (not shown) that traverses the head-end node A (e.g., the PLR for the particular tunnel) and tail-end node D (e.g., the merge point for the particular tunnel). In this manner, a backup tunnel may be embodied as a sliced tunnel to alleviate one or more problems described above. In particular, where a backup tunnel having a required bandwidth is unavailable to the particular tunnel, a sliced backup tunnel may be used accordingly.

Figure 7:
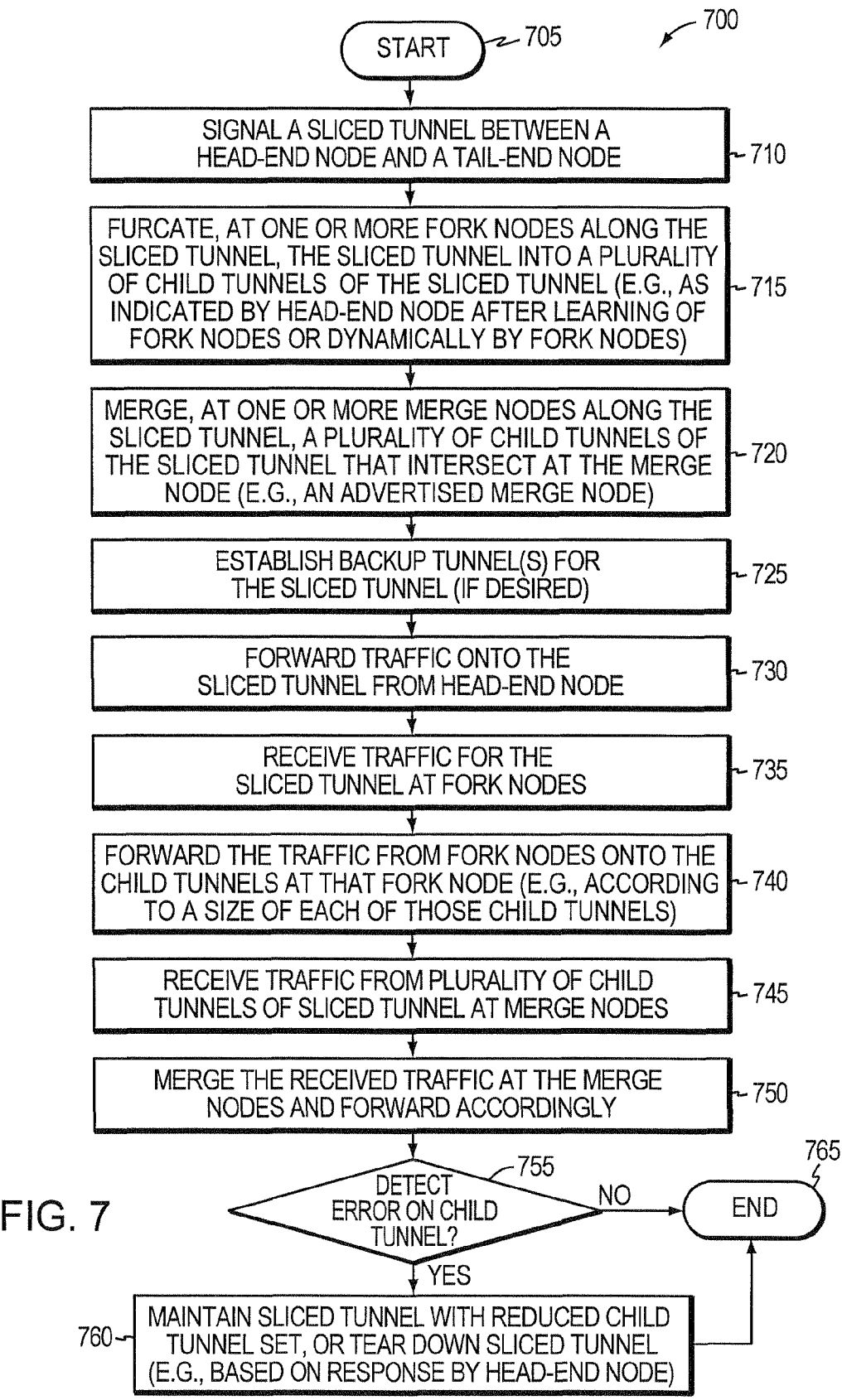
FIG. 7 illustrates an example procedure for establishing and maintaining sliced tunnels in accordance with one or more embodiments described herein.

FIG. 7 illustrates an example procedure for establishing and maintaining sliced tunnels in a computer network in accordance with one or more embodiments described herein. The procedure 700 starts at step 705, and continues to step 710, where a head-end node (e.g., node A) signals a sliced tunnel (e.g., ST1) to a tail-end node (e.g., node D), as described above. In step 715, sliced tunnel process 246 of one or more fork nodes along the sliced tunnel (e.g., nodes B and C) furcate the sliced tunnel into a plurality of child tunnels of the sliced tunnel. For example, node B furcates the sliced tunnel ST1 into child tunnels CT1, CT2, and CT3. For instance, as mentioned above, the head-end node may either compute the sliced tunnel and child tunnels and signal the sliced tunnel indicating the child tunnels, or the fork nodes may dynamically determine that the tunnel is sliceable, and may compute the child tunnels themselves.

In step 720, sliced tunnel process 246 of one or more merge nodes along the sliced tunnel (e.g., nodes C and D) may merge a plurality of child tunnels of the sliced tunnel that intersect at the merge node. (Note that a merge node may have first advertised its ability as a merge node, as described above.) For example, node D merges child tunnels CT4, CT5, and CT6. Also, as noted, node C may be a fork node and a merge node, illustratively merging child tunnels CT2 and CT3, then furcating the merged portion of the sliced tunnel into child tunnels CT4, CT5, and CT6, accordingly. Also, in step 725, one or more backup tunnels may be established for the sliced tunnel (and/or child tunnels) if desired as described above.

Once the sliced tunnel is established, the head-end node (node A) may forward traffic onto the sliced tunnel in step 730. A fork node (e.g., node B) may receive the traffic in step 735, and forward the traffic from onto the child tunnels at that fork node (e.g., child tunnels CT1, CT2, and CT3) in step 740. Illustratively, the fork nodes may forward the traffic onto the child tunnels according to a size of each of those child tunnels, as mentioned above. In step 745, merge nodes may receive the traffic on a plurality of child tunnels (e.g., from CT2 and CT3 at node C), and merges the received traffic in step 750 to forward it accordingly. For instance, at node C, the merge traffic may be forwarded according to a furcating fork node onto child tunnels CT4, CT5, and CT6. On the other hand, merge node E (e.g., a tail-end node) may forward the traffic onto the sliced tunnel (if it continues beyond node E), other child tunnels, another tunnel, without any tunnels, etc., as mentioned above.

If an error (failure) of a child tunnel is detected at step 755 during utilization of the sliced tunnel, the sliced tunnel in step 760 may either be maintained with a reduced child tunnel set (e.g., reduced bandwidth), or the sliced tunnel may be torn down (e.g., based on response by head-end node), as described above. The procedure 700 ends in step 765, notably with either a failed sliced tunnel, reduced sliced tunnel, or with continuing traffic forwarded from the head-end node onto an intact sliced tunnel (i.e., no failure detected in step 755).

Advantageously, the novel techniques described herein establish and maintain sliced tunnels in a computer network. By slicing tunnels, the novel techniques allow traffic on sliced tunnels to follow diverse path segments between the head-end node (source) and tail-end node (destination). In particular, the techniques described above allow sliced tunnels (primary and/or backup) to satisfy bandwidth constraints, utilize parallel links between nodes, etc., without burdening the network with excess tunnels (e.g., on shared links). Also, the dynamic aspects of one or more embodiments described herein alleviate the need for cumbersome and inefficient manual configuration.

While there have been shown and described illustrative embodiments that establish and maintain sliced tunnels in a computer network, it is to be understood that various other adaptations and modifications may be made within the spirit and scope of the present invention. For example, the embodiments have been shown and described herein relating to various protocol messages and fields, e.g., IGP and/or RSVP and related fields, etc. However, the embodiments of the invention in their broader sense are not so limited, and may, in fact, be used with other messaging/notification protocols or other fields, such as proprietary or application specific protocols, or other fields (e.g., TLVs) within the messages described herein, as will be understood by those skilled in the art. Further, while sliced tunnels have been illustratively shown as point-to-point (P2P) tunnels, the structure of the tunnels may also correspond to point-to-multipoint (P2MP), multipoint-to-point (MP2P), or multipoint-to-multipoint (MP2MP) tunnels, as will be appreciated by those skilled in the art (e.g., slicing tunnels between head-end nodes and tail-end nodes of the tunnel structure).

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
computing a path for a sliced tunnel that extends from a head-end node in a computer network to a tail-end node in the computer network, the sliced tunnel furcated into a plurality of child tunnels at one or more fork nodes located downstream from the head-end node, each child tunnel carrying a portion of traffic for the sliced tunnel, and the child tunnels merged at one or more merge nodes located downstream from respective ones of the one or more fork nodes, the portions of traffic on the child tunnels aggregated at the merge nodes;
sending a signaling message, by the head-end node, to establish the sliced tunnel along the computed path, the signaling message to include an indication of the one or more fork nodes where the sliced tunnel is furcated into child tunnels and the one or more merge nodes where child tunnels are merged; and
forwarding traffic from the head-end node onto the sliced tunnel.

2. The method of claim 1, wherein the signaling message is a resource reservation protocol (RSVP) signaling message.

3. The method of claim 2, wherein the indication of the one or more fork nodes where the sliced tunnel is furcated into child tunnels and the one or more merge nodes where child tunnels are merged is provided in an explicit route object (ERO) within the RSVP signaling message.

4. The method of claim 2, wherein the RSVP signaling message further includes one or more objects that indicate load-balancing techniques to utilize when forwarding traffic on child tunnels.

5. The method of claim 1, wherein the tail-end node is one of the one or more merge nodes.

6. The method of claim 1, wherein at least one of the one or more fork nodes is also one of the one or more merge nodes.

7. The method of claim 1, further comprising:
prior to computing the path for the sliced tunnel, receiving, at the head-end node, an advertisement from each of the one or more fork nodes that indicates the respective node has an ability to furcate tunnels.

8. The method of claim 1, further comprising:
prior to computing the path for the sliced tunnel, receiving, at the head-end node, an advertisement from each of the one or more merge nodes that indicates the respective node has an ability to merge tunnels.

9. The method of claim 1, wherein traffic on the sliced tunnel is load balanced at the one or more fork nodes onto child tunnels in proportion to a size of child tunnels.

10. The method of claim 1, wherein the sliced tunnel is a backup tunnel for a primary tunnel between the head-end node and the tail-end node.

11. A head-end node, comprising:
a network interface coupled to a computer network;
a processor coupled to the network interface and configured to execute one or more processes; and
a memory configured to store a sliced tunnel process executable on the processor, the sliced tunnel process when executed operable to
compute a path for a sliced tunnel that extends from the head-end node to a tail-end node, and
generate a signaling message, the signaling message to include an indication of one or more fork nodes located downstream from the head-end where the sliced tunnel is to be furcated into child tunnels that carry a portion of traffic for the sliced tunnel and of one or more merge nodes located downstream from respective ones of the one or more fork nodes where the portions of traffic on the child tunnels are aggregated, and
cause the signaling message to be sent on the network interface along the computed path to establish the sliced tunnel.

12. The head-end node of claim 11, wherein the signaling message is a resource reservation protocol (RSVP) signaling message.

13. The head-end node of claim 11, wherein the indication of the one or more fork nodes where the sliced tunnel is to be furcated into child tunnels and of the one or more merge nodes where the portions of traffic on the child tunnels are aggregated is an explicit route object (ERO) within the signaling message.

14. The head-end node of claim 11, wherein the signaling message further includes one or more objects that indicate load-balancing techniques to utilize at the one or more fork nodes when forwarding traffic on child tunnels.

15. The head-end node of claim 11, wherein at least one of the one or more fork nodes is also one of the one or more merge nodes.

16. The head-end node of claim 11, wherein the computation of the path for the sliced tunnel is based on one or more received advertisements of nodes that have an ability to operate as fork nodes.

17. The head-end node of claim 11, wherein the computation of the path for the sliced tunnel is based on one or more received advertisements of nodes that have an ability to operate as merge nodes.

18. The head-end node of claim 11, wherein traffic on the sliced tunnel is load balanced onto child tunnels in proportion to a size of child tunnels.

19. The head-end node of claim 11, wherein the sliced tunnel is a backup tunnel for a primary tunnel extending from the head-end node.

20. An apparatus comprising:
a processor;
means for computing a path for a sliced tunnel that extends from a head-end node in a computer network to a tail-end node in the computer network, the sliced tunnel furcated into a plurality of child tunnels at one or more fork nodes located downstream from the head-end node, each child tunnel carrying a portion of traffic for the sliced tunnel, and the child tunnels merged at one or more merge nodes located downstream from respective ones of the one or more fork nodes, the portions of traffic on the child tunnels aggregated at the merge nodes;
means for sending a signaling message to establish the sliced tunnel along the computed path, the signaling message to include an indication of the one or more fork nodes where the sliced tunnel is furcated into child tunnels and the one or more merge nodes where child tunnels are merged; and
means for forwarding traffic onto the sliced tunnel.

* * * * *